US010032321B2

(12) United States Patent
Lacaille

(10) Patent No.: US 10,032,321 B2
(45) Date of Patent: Jul. 24, 2018

(54) METHOD AND SYSTEM FOR PREDICTING THE OPERATION OF AN AIRCRAFT BY SIMILARITY ANALYSIS USING DISTRIBUTED STORAGE AND CALCULATION CAPACITIES

(71) Applicant: Snecma, Paris (FR)

(72) Inventor: Jérôme Henri Noël Lacaille, Rosny Sous Bois (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 15/171,394

(22) Filed: Jun. 2, 2016

(65) Prior Publication Data
US 2016/0358387 A1 Dec. 8, 2016

(30) Foreign Application Priority Data
Jun. 3, 2015 (FR) ...................................... 15 55047

(51) Int. Cl.
*G07C 5/08* (2006.01)
*B64F 5/00* (2017.01)
(Continued)

(52) U.S. Cl.
CPC .............. *G07C 5/0808* (2013.01); *B64F 5/60* (2017.01); *G05B 23/0221* (2013.01);
(Continued)

(58) Field of Classification Search
CPC .... G07C 5/0808; G07C 5/008; G07C 5/0841; G07C 5/0816; B64F 5/60; G06F 17/18; G05B 23/0283; G05B 23/0021
See application file for complete search history.

(56) References Cited

U.S. PATENT DOCUMENTS

| 7,984,146 B2 * | 7/2011 | Rozak .................... G06Q 10/06 701/29.3 |
| 2007/0260726 A1 * | 11/2007 | Rozak .................... G06Q 10/06 709/224 |

(Continued)

FOREIGN PATENT DOCUMENTS

WO 2012/110733 A1 8/2012

OTHER PUBLICATIONS

D. Abbott et al., "Concepts for an Integrated Vehicle Health Monitoring System" Review of Quantitative Nondestructive Evaluation, vol. 22, 2003.

(Continued)

*Primary Examiner* — Anne Marie Antonucci
(74) *Attorney, Agent, or Firm* — Pearne & Gordon LLP

(57) ABSTRACT

A method of estimating future change in operation of a monitored aircraft (A), including the following steps performed by a computer on board the monitored aircraft, to calculate a current state of the monitored aircraft ($E_{CA}$) from measurements ($VF_A$) of variables related to operation of the monitored aircraft, to send a request to analyze the similarity of the calculated current state with previous states ($E_{PB}$) of similar aircraft, and to analyze change in operation ($S_{PB}$) of each similar aircraft having a similar previous state to determine a probable change ($F_{PA}$) in operation of the monitored aircraft. The method includes a step performed by a computer (B) on board each aircraft, to compare the calculated current state ($E_{CA}$) with previous states ($E_{PB}$) of similar aircraft, and send the change in operation ($S_{PB}$) corresponding to an identified similar previous state. The invention includes an on board system capable of implementing the method.

13 Claims, 2 Drawing Sheets

(51) Int. Cl.
 G07C 5/00 (2006.01)
 G05B 23/02 (2006.01)
 G06F 17/18 (2006.01)
 B64F 5/60 (2017.01)
(52) U.S. Cl.
 CPC ......... *G05B 23/0283* (2013.01); *G06F 17/18* (2013.01); *G07C 5/008* (2013.01); *G07C 5/0816* (2013.01); *G07C 5/0841* (2013.01)

(56) References Cited

U.S. PATENT DOCUMENTS

| 2012/0239244 | A1* | 9/2012 | Costes | B64C 13/503 |
| | | | | 701/31.9 |
| 2013/0211768 | A1 | 8/2013 | Gerez | |
| 2013/0325286 | A1 | 12/2013 | Lacaille | |
| 2015/0120214 | A1 | 4/2015 | Gouby | |
| 2015/0287249 | A1 | 10/2015 | Lacaille | |
| 2016/0103038 | A1 | 4/2016 | Laaille | |

OTHER PUBLICATIONS

Jerome Lacaille et al., "Online Normalization Algorithm for Engine Turbofan Monitoring" Annual Conference of the Prognostics and Health Management Society, 2014.

Edison Pignaton De Freitas et al., "Decentralized Task Distribution among Cooperative UAVs in Surveillance Systems Applications" IEEE/IFIP WONS 2010, The Seventh International Conference on Wireless On-demand Network Systems and Servies.

Search Report issued in French Patent Application No. FR 15 55047 dated Apr. 14, 2016.

Utility U.S. Appl. No. 15/028,267 "Monitoring of an Aircraft Engine to Anticipate the Maintenance Operations" filed Apr. 8, 2016.

Utility U.S. Appl. No. 15/028,284 "Method, System and Computer Program for the Acoustic Analysis of a Machine" filed Apr. 8, 2016.

* cited by examiner

METHOD AND SYSTEM FOR PREDICTING THE OPERATION OF AN AIRCRAFT BY SIMILARITY ANALYSIS USING DISTRIBUTED STORAGE AND CALCULATION CAPACITIES

TECHNICAL DOMAIN

The domain of the invention is monitoring of aircraft, particularly for the purposes of anticipating maintenance operations. The invention is aimed more particularly at predicting a future change in operation of an aircraft by analysis of similarity with previous operation of an entire fleet of aircraft.

STATE OF PRIOR ART

Aircraft, and particularly aircraft engines, have become data generating systems. These data are derived from measurements obtained by digitisation of data derived from sensors, but also from calculations, results originating from models, and from commands. They are acquired at increasingly high frequencies but are only transferred to the ground occasionally due to their high volumes.

The state of an engine (or an aircraft or any other sub-component of the studied aircraft) at a given moment may be described from these data. Observation trajectories of these data (curves) may be analysed and converted into a vector indicator with a fairly large dimension representative of this state or at least of a specific aspect of this state.

Experience acquired on an entire fleet of aircraft can be used if it is required to know whether or not the observed system is in a correct (normal) or degraded state, or if it is tending towards a degraded state.

Patent application WO 2012/110733 A1 discloses a solution according to which the current state of the observed system is compared with previous states of the entire fleet in order to search for previous states similar to the current state. A study of the "future" of these similar observations encountered in the past can be used to predict the probable change in the observed system.

This type of analysis requires access to a maximum amount of information derived from the aircraft fleet to benefit from a maximum amount of operating experience so that relevant predictions can be obtained.

But due to the data volumes that will soon be generated by aircraft (more than 1 Gb per flight), this requires a significant data management infrastructure and a processing tool capable of calculating the state of the observed system for all aircraft and at all previous dates, and then searching for similar states, sufficiently quickly to be able to send the results to each aircraft.

However, while the initial volume of data is already high, calculations of states increase the volume by a non-negligible multiplication factor (number of instants, dimensions, observation scales, sub-systems), and the search for similar states squares this volume. Therefore centralisation of these storage and processing operations is particularly difficult, and in practice cannot really be envisaged for a large fleet of aircraft.

DESCRIPTION OF THE INVENTION

The purpose of the invention is to disclose a practical implementation of such monitoring by analysis of the similarity of a current operating state with previous operating states of an aircraft fleet that can circumvent the problem with the design of a calculation and storage centre and limit the communication volume.

To achieve this, the invention discloses a method of estimating a future change in operation of a monitored aircraft, including the following steps performed by a computer on board the monitored aircraft:

calculate a current state of the monitored aircraft from measurements of variables related to operation of the monitored aircraft;

send a request to analyse the similarity of the calculated current state with previous states of aircraft similar to the monitored aircraft;

reception and analysis of a change in operation of each similar aircraft having a previous state similar to the calculated current state, to determine a probable change in operation of the monitored aircraft.

Some preferred but non-limitative aspects of this method are given below:

it includes storage of the calculated current state in a database on board the monitored aircraft;

it includes storage of the measurements of variables related to operation of the aircraft in the database on board the monitored aircraft;

it includes the monitored aircraft sending an alert if the probable determined change in operation is an abnormal change;

the step to send a request to analyse the similarity of the calculated current state includes sending said calculated current state to a storage centre;

the step to send a request to analyse the similarity of the calculated current state includes sending said calculated current state by broadcasting to similar aircraft;

it includes a step performed by a computer on board a similar aircraft to compare the calculated current state of the monitored aircraft with previous states of said similar aircraft to identify a similar previous state, and a step to reply to the request to analyse the similarity of the calculated current state of the monitored aircraft that includes sending the change in operation of the similar aircraft corresponding to the identified similar previous state;

the change in operation corresponding to an identified similar previous state is only sent if said change is an abnormal change;

it includes a step in which the similar aircraft receives the calculated current state of the monitored aircraft from the storage centre, and the step to reply to the request to analyse the similarity of the calculated current state includes sending the change in operation corresponding to the identified similar previous state, to the storage centre;

the step to analyse the change in operation of each similar aircraft having a previous state similar to the calculated current state to determine a probable change in operation of the monitored aircraft is preceded by a step in which the monitored aircraft receives the change in operation of each similar aircraft having an identified similar previous state from the storage centre.

The invention also relates to a system that will be placed on board a monitored aircraft, including a computer configured to calculate a current state of the monitored aircraft from variables related to operation of the monitored aircraft, to send a request to analyse the similarity of the calculated current state with previous states of aircraft similar to the monitored aircraft, to receive and analyse a change in operation of each similar aircraft having a previous state similar to the current state to determine a probable change in operation of the monitored aircraft.

The invention includes a diagnostic infrastructure of the operation of a fleet of similar aircraft, comprising a system according to the invention on board each aircraft in the fleet and a storage centre configured to store the request to analyse the similarity of the current state of a monitored aircraft and the change in operation of each aircraft similar to the monitored aircraft having a previous state similar to the current state.

BRIEF DESCRIPTION OF THE DRAWINGS

Other aspects, purposes, advantages and characteristics of the invention will become clearer after reading the following detailed description of preferred embodiments of this invention, given as non-limitative examples, with reference to the appended drawings on which.

DETAILED PRESENTATION OF PARTICULAR EMBODIMENTS

According to a first aspect, the invention discloses a method of estimating a future change in operation of a monitored aircraft. The monitored operation may be operation of the aircraft in the broad sense of the term, or of a component or system of the aircraft. The invention can advantageously be used for monitoring an engine installed on an aircraft.

This method includes the following steps:
calculate a current state of the monitored aircraft from measurements of variables related to operation of the monitored aircraft;
compare this current state with previous states of similar aircraft belonging to a fleet of aircraft of the same type as the monitored aircraft to identify previous states similar to the current state;
analyse the change in operation of each similar aircraft having a previous state similar to the current state to determine a probable change in operation of the monitored aircraft.

In particular, this method can make use of the solution disclosed in patent application WO 2012/110733 A1 mentioned above.

In general, the invention discloses use of this method consisting of implementing a storage and calculation environment distributed on a fleet of systems on board aircraft in an entire fleet. The idea is thus to distribute processing and storage while keeping results where they are useful, to overcome the problem of designing a central calculation and storage centre.

Figure 1:
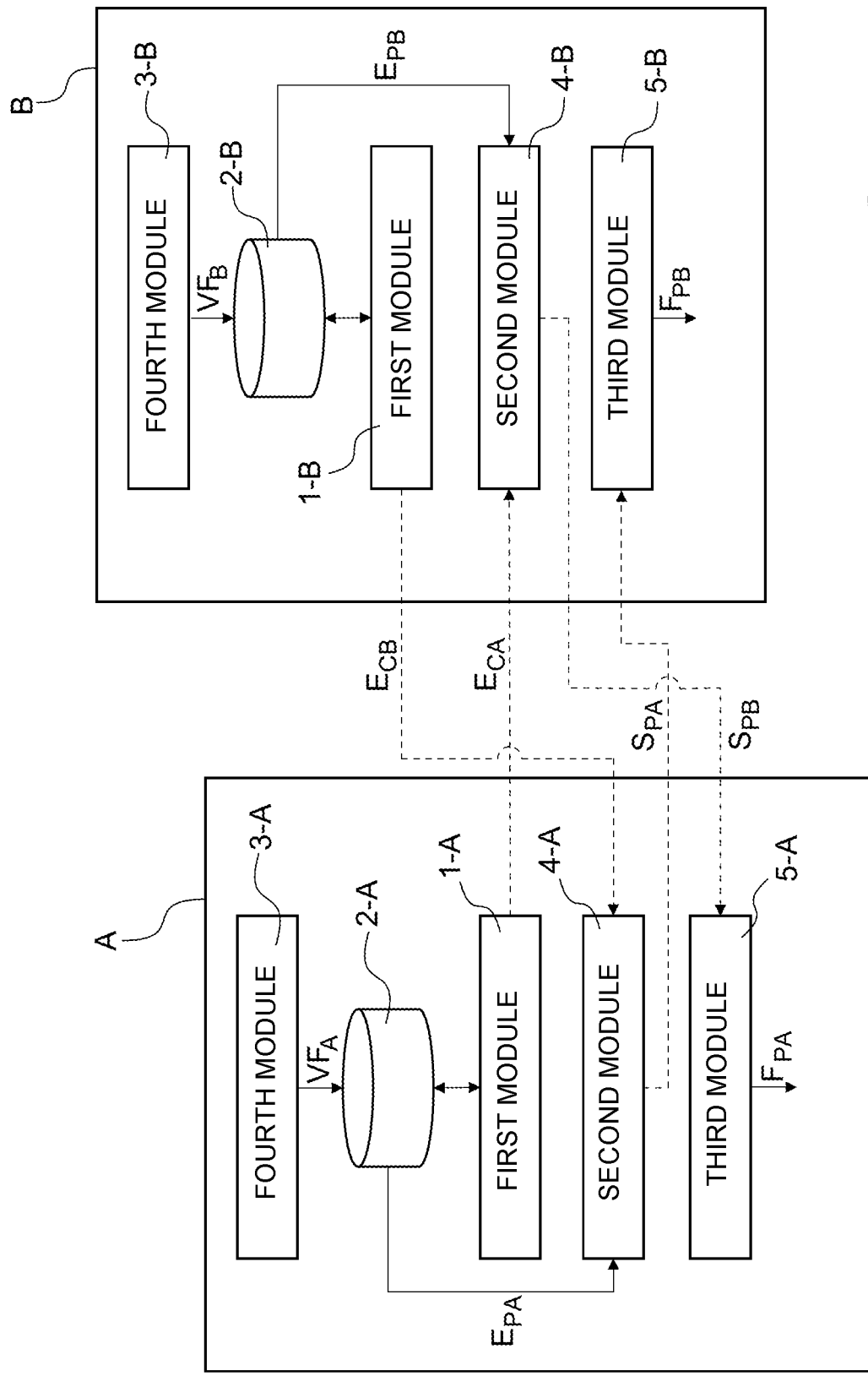
FIG. 1 is a diagram showing systems on board two aircraft and information sharing between these systems for implementation of the invention.

The invention will be better understood after reading the following description of FIG. 1 that illustrates systems A, B designed to be installed on board two aircraft in the fleet and sharing of information between these systems when implementing the invention. In the following description in FIG. 1, system A is the system on an aircraft called the monitored aircraft, for which it is required to predict a future change in operation, while system B is the system on a so-called similar aircraft belonging to a fleet of aircraft of the same type as the monitored aircraft in which a search is made for previous operating states similar to the current state of the monitored aircraft.

However, the on board systems A, B are equivalent, such that system B may be the system on a monitored aircraft and system A may be a system on a similar aircraft on which a similarity search is made.

Each on board system A, B comprises a computer with several modules, each configured for implementation of a function.

Each computer thus has a first module 1-A, 1-B configured to calculate a current state $E_{CA}$, $E_{CB}$ of the monitored aircraft from measurements of variables $V_{FA}$, $V_{FB}$ related to operation of the monitored aircraft and to send a request for a similarity analysis of the calculated current state with the previous states of a fleet of similar aircraft.

Each computer also has a second module 4-A, 4-B configured to receive a calculated current state $E_{CA}$, $E_{CB}$ of a monitored aircraft, to compare the calculated current state $E_{CA}$, $E_{CB}$ with previous states $E_{PB}$, $E_{PA}$ of the aircraft B, A making the analysis to identify a similar previous state, and to reply to the request for a similarity analysis of the calculated current state by sending the change in operation $S_{PB}$, $S_{PA}$ corresponding to the identified similar previous state.

The computer on each aircraft also has a third module 5-A, 5-B configured to receive the change in operation $S_{PB}$, $S_{PA}$ of a similar aircraft with a similar previous state, and to determine a probable change in operation $F_{PA}$, $F_{PB}$ of the aircraft by analysing the change in operation $S_{PB}$, $S_{PA}$ of the similar aircraft with a similar previous state.

The on board system A, B may also be configured to generate and send an alert when the probable change is an abnormal change. This alert may be sent to an alert monitoring centre on the ground, responsible particularly for relaying data to a fleet manager (for example an aircraft fleet engine maintenance manager), for example for purposes of a more detailed analysis, or to the airline operating the aircraft, for example when the abnormal probable change data is very reliable.

With such a configuration:
Each aircraft can use its first module 1-A, 1-B to calculate its current state and to request a similarity analysis of its current state with previous states of aircraft in the entire fleet;
Each aircraft in the fleet can receive this request. It has its first module 1-A, 1-B on board, that it can use to calculate its own state $E_{PB}$ at different instants of its past (the current state calculation being made in real time), and its second module 4-A, 4-B that it uses to identify any states similar to the current state of the monitored aircraft among its previous states, and to reply to the similarity analysis request if applicable by sending the previous state(s) identified as being similar and the corresponding future change(s);
The aircraft that made the request retrieves the replies and deduces its probable change by means of its third module 5-A, 5-B.

Each on board system A, B also comprises a database 2-A, 2-B that can be used to store the calculated current state, and thus to keep a history of this state. The database 2-A, 2-B can also keep data $V_{FA}$, $V_{FB}$ generated during each flight, for example derived from a fourth module 3-A, 3-B of the on board system responsible for measuring variables related to operation of the aircraft.

The invention thus proposes to distribute on each aircraft the calculation and storage of its own states during time, the study of the similarity of its own states with a current state of another aircraft, and to determine its probable change by making a synthesis of replies from other aircraft that have experienced similar operation in the past.

This solution requires a storage capacity on board each aircraft. Storage may for example be limited to storage in compressed form for the specific state of the aircraft itself and its history of current states. As an illustrative example, this storage capacity can be less than 40 Tb per aircraft to store states covering a 10-year history with 10 flights per day and 1 Gb of data per flight.

Alternately, if possible depending on the storage capacity, all information including initial measurements related to operation of the aircraft, can be stored to maintain the possibility of "working backwards", for example to make a more precise analysis of the initial measurements.

This solution also requires a computer on board each aircraft capable of encoding the current state, measuring similarity and making a synthesis for each request for a similarity analysis by studying replies from similar aircraft that have experienced similar behaviour in the past. The state of the observed system may be seen as a compression of data that it generates and a self-adapting algorithm such as MP-PCA (*Mixture of Probabilistic Principal Component Analyser*) can be used for this purpose. This algorithm, for which an example implementation is described in the article by J. Lacaille et al., "Online Normalization Algorithm for Engine Turbofan Monitoring," in PHM, 2014, observes large volumes of data produced by the aircraft (engines and avionic systems) and compresses them in real time into a much smaller vector that can then be recoded using conventional on-line storage techniques.

This solution also requires communication between aircraft of requests for similarity analyses and replies to these requests. In general, only a small number of requests is necessary for each flight. This number can be limited to one request per flight, or even to one request per day when longer term monitoring is performed.

Furthermore, a similar aircraft will only reply to requests for which it has found a similar previous state. In order to further reduce data exchanges, as part of the invention it is possible that a similar aircraft will not reply to such a request by sending its similar previous state and the corresponding change, unless this change leads to abnormal future operation.

The invention thus eliminates the extremely voluminous export of data to the ground, necessary for a solution using a central calculation and storage centre on the ground.

According to the invention, each aircraft accesses its own state on board that it analyses directly in real time. It can immediately compare it with previous states of its own engines and states of engines in the other aircraft that have communicated with it, for example locally and therefore at low cost.

When an aircraft communicates with other aircraft, for example with its neighbours at a boarding gate, it sends a description of its own state and receives information from other aircraft about their previous states. Each aircraft independently creates a baseline (vector code) of states and associated consequences. In other words, it builds its own decision model making use of its own information and similarity information sent by other aircraft. Therefore, it is capable of immediately reacting to any new information. Advantageously, maintenance work (if required) can thus be anticipated if abnormal operation is detected.

In one possible embodiment of the invention, the request to analyse the similarity of the calculated current state includes sending said calculated current state $E_{CA}$ by broadcasting to the fleet of similar aircraft.

A stochastic communication model limits broadcasting of the request to "nearby" aircraft, in other words aircraft capable of receiving and processing the request, for example aircraft that are present around a boarding gate at the time that the request is sent. These "nearby" aircraft form a sub-population of the fleet of similar aircraft that varies at random during time. The general broadcast is then replaced by a sequence of communications involving different sub-populations, randomly distributed. Although random, communications between aircraft are frequent. Causes (states)/consequences (operation changes) models are sent through this dynamic network without the need for an expensive supervision instance, thus making an immediately useable update to information available to each aircraft.

Figure 2:
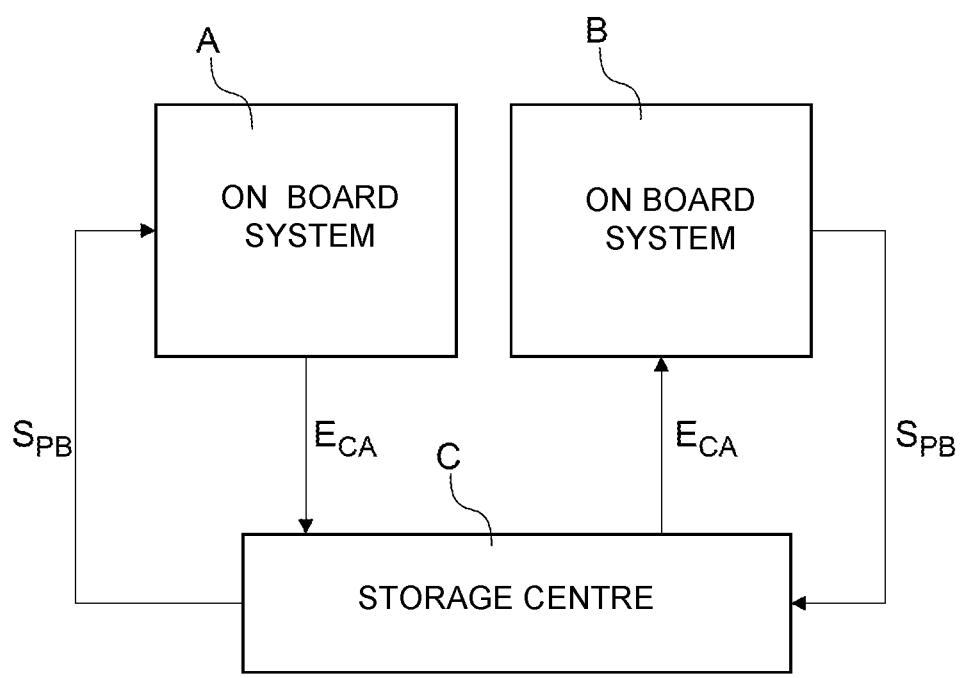
FIG. 2 shows a possible embodiment of the invention in which a storage centre is used to deposit/retrieve the current state of the monitored aircraft and the similar previous states of the fleet of similar aircraft.

In another embodiment shown in FIG. 2, non-exclusive of broadcasting, the request to analyse the similarity of the calculated current state includes sending said calculated current state $E_{CA}$ to a storage centre C. The storage centre C may be a central centre, for example a centre on the ground, a centre distributed on several locations on the ground, for example on different correspondence platforms, or a remote centre on each aircraft.

This storage centre C is used as a mail box to limit the quantity of exchanged messages. A monitored aircraft A sends its current state $E_{CA}$ for which the similarity analysis request is made, to the storage centre. A similar aircraft B retrieves the current state $E_{CA}$ of the monitored aircraft from this storage centre, when it has the time and access means. When a similar previous state is identified, the similar aircraft replies to the request by sending its identified similar previous state and the corresponding change in operation $S_{PB}$ to said storage centre. The monitored aircraft retrieves this information and can use it to estimate its probable future change.

In one possible embodiment of the invention, the data exchange (requests, replies to requests, possible alerts) may be done through a satellite link.

The invention is not limited to the method as disclosed above, and it includes the system that is installed on board each aircraft in the fleet. Such a system is a standalone system and only requires a standardised communication interface, for example a local interface.

The invention also includes an infrastructure for an operational diagnostic of a fleet of similar aircraft, including a system like that disclosed above, installed on board each aircraft in the fleet and a storage centre C configured to store the request for a similarity analysis of the current state of a monitored aircraft and the change in operation of each aircraft similar to the monitored aircraft having a previous state similar to the current state.

The invention claimed is:

1. A method for monitoring an aircraft, including a computer on board the monitored aircraft performing the steps of:

collecting measurements made by sensors of variables related to current operation of the monitored aircraft, calculating a current state of the monitored aircraft from the collected measurements, sending a request to analyze the similarity of the calculated current state with previous states of aircrafts similar to the monitored aircraft, receiving and analyzing a change in operation of each similar aircraft having a previous state similar to the calculated current state to estimate a probable change in the future operation of the monitored aircraft, and if the estimated probable change is an abnormal change, sending an alert to a monitoring center on the ground to anticipate maintenance on the monitored aircraft.

2. The method according to claim 1, further including the step of storing the calculated current state in a database on board the monitored aircraft.

3. The method according to claim 2, further including the step of storing the collected measurements in the database on board the monitored aircraft.

4. The method according to claim 1, in which the step of sending a request to analyze the similarity of the calculated current state includes sending said calculated current state to a storage center.

5. The method according to claim 1, in which the step of sending a request to analyze the similarity of the calculated current state includes sending said calculated current state by broadcasting to the similar aircrafts.

6. The method according to claim 1, including a step performed by a computer on board a similar aircraft of comparing the calculated current state of the monitored aircraft with previous states of said similar aircraft to identify a similar previous state, and a step of replying to the request to analyze the similarity of the calculated current state of the monitored aircraft that includes sending the change in operation of the similar aircraft corresponding to the identified similar previous state.

7. The method according to claim 6, in which the change in operation corresponding to an identified similar previous state is only sent if said change is an abnormal change.

8. Method according to claim 7, in which the step of sending a request to analyze the similarity of the calculated current state includes sending said calculated current state to a storage center, and further including a step in which the similar aircraft retrieves the calculated current state of the monitored aircraft from the storage center, and in which the step of replying to the request to analyze the similarity of the calculated current state includes sending the change in operation corresponding to the identified similar previous state to the storage center.

9. The method according to claim 8, in which the step of receiving and analyzing a change in operation of each similar aircraft having a previous state similar to the calculated current state to estimate a probable change in the future operation of the monitored aircraft is preceded by a step in which the monitored aircraft receives the change in operation of each similar aircraft having an identified similar previous state from the storage center.

10. An aircraft monitoring system to be placed on board a monitored aircraft, including a computer configured:
    to collect measurements made by sensors of variables related to operation of the monitored aircraft,
    to calculate a current state of the monitored aircraft from the collected measurements,
    to send a request to analyze the similarity of the calculated current state with previous states of aircrafts similar to the monitored aircraft,
    to receive and analyze a change in operation of each similar aircraft having a previous state similar to the current state to estimate a probable change in the future operation of the monitored aircraft,
    if the estimated probable change is an abnormal change, to send an alert to a monitoring center on the ground to anticipate maintenance operations on the monitored aircraft.

11. The system according to claim 10, in which the computer is further configured to compare previous states of the monitored aircraft with a current state of a similar aircraft to identify one or several similar previous states.

12. The system according to claim 10, also comprising a database to store the current state of the monitored aircraft.

13. An infrastructure for an operational diagnostic of a fleet of similar aircrafts, including a system according to claim 10 on board each aircraft in the fleet and a storage center configured to store the request for a similarity analysis of the current state of a monitored aircraft and the change in operation of each aircraft similar to the monitored aircraft having a previous state similar to the current state.

\* \* \* \* \*